United States Patent
Wagle et al.

(10) Patent No.: US 11,214,724 B1
(45) Date of Patent: Jan. 4, 2022

(54) EPOXIDIZED ALPHA OLEFIN BASED LUBRICANT FOR WATER-BASED DRILLING FLUIDS

(71) Applicant: SAUDI ARABIAN OIL COMPANY, Dhahran (SA)

(72) Inventors: Vikrant Wagle, Dhahran (SA); Jothibasu Ramasamy, Dhahran (SA); Abdullah S. Al-Yami, Dhahran (SA); Khawlah A. Alanqari, Al-Khubar (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 16/943,434

(22) Filed: Jul. 30, 2020

(51) Int. Cl.
C09K 8/06 (2006.01)
E21B 21/06 (2006.01)
E21B 21/00 (2006.01)

(52) U.S. Cl.
CPC ............. *C09K 8/06* (2013.01); *E21B 21/003* (2013.01); *E21B 21/062* (2013.01); *C09K 2208/34* (2013.01)

(58) Field of Classification Search
CPC ..... C09K 8/06; C09K 2208/34; E21B 21/003; E21B 21/062
See application file for complete search history.

(56) References Cited

U.S. PATENT DOCUMENTS

| | | | |
|---|---|---|---|
| 3,761,410 A | 9/1973 | Mondshine et al. | |
| 3,953,392 A * | 4/1976 | Higuchi | C07C 67/26 524/114 |
| 4,943,383 A * | 7/1990 | Avery | C10M 143/18 508/304 |
| 5,403,822 A | 4/1995 | Mueller et al. | |
| 5,945,386 A | 8/1999 | Alonso-DeBolt et al. | |
| 6,596,670 B1 | 7/2003 | Mueller et al. | |
| 7,384,892 B2 | 6/2008 | Melbouci et al. | |
| 7,786,052 B2 | 8/2010 | Ballard | |
| 7,786,053 B2 * | 8/2010 | Ballard | C09K 8/36 507/239 |
| 2013/0200295 A1 * | 8/2013 | Rebrovic | C10M 171/008 252/68 |
| 2014/0142003 A1 * | 5/2014 | Miller | C09K 8/18 507/103 |
| 2014/0142013 A1 * | 5/2014 | Elomari | C10M 105/34 508/463 |
| 2017/0044459 A1 * | 2/2017 | Goyal | C10M 111/04 |
| 2018/0223160 A1 | 8/2018 | Al-Yami et al. | |

FOREIGN PATENT DOCUMENTS

| | | |
|---|---|---|
| CN | 110804169 A | 2/2020 |
| EP | 0612835 A2 | 8/1994 |
| EP | 0931828 A2 | 7/1999 |
| WO | 9010682 A1 | 9/1990 |
| WO | 2019173061 A1 | 9/2019 |

OTHER PUBLICATIONS

"Vikopol", Product Page, Arkema Worldwide, Date Accessed: Jul. 29, 2020, URL: <http://www.arkemaepoxides.com/en/epoxides/product-viewer/Vikopol/> (2 pages).
Kania, Dina et al., "A review of biolubricants in drilling fluids: Recent research, performance, and applications", Journal of Petroleum Science and Engineering, ScienceDirect, Elsevier B.V. vol. 135, Sep. 2015, pp. 177-184 (8 pages).
International Search Report and Written Opinion issued in Application No. PCT/US2020/052091, dated Apr. 22, 2021 (14 pages).

* cited by examiner

*Primary Examiner* — Alicia Bland
(74) *Attorney, Agent, or Firm* — Osha Bergman Watanabe & Burton LLP

(57) ABSTRACT

Drilling fluid compositions and methods for using drilling fluid compositions are provided with enhanced lubricating properties that include an aqueous-based fluid, one or more drilling fluid additives, and a lubricating additive. The lubricating additive may be an epoxidized α-olefin and the drilling fluid may include the lubricating additive in an amount ranging from about 1 ppb to about 20 ppb. Methods for using the drilling fluid compositions may further include mixing an aqueous base fluid with one or more drilling fluid additives and a lubricating additive, wherein the lubricating additive includes epoxidized α-olefin and the drilling fluid may include the lubricating additive in an amount ranging from about 0.5 ppb to about 20 ppb, and introducing the drilling fluid to a subterranean formation.

17 Claims, No Drawings

EPOXIDIZED ALPHA OLEFIN BASED LUBRICANT FOR WATER-BASED DRILLING FLUIDS

BACKGROUND

During drilling operations, a drilling fluid, which may also be referred to as drilling mud, is circulated through the wellbore to cool the drill bit, to convey rock cuttings to the surface, and to support the wellbore against collapse and intrusion of fluids from the formation, among other purposes.

BRIEF SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed here relate to drilling fluid compositions that include an aqueous-based fluid, and a lubricating additive. The lubricating additive may be an epoxidized α-olefin. The drilling fluid may include the lubricating additive in an amount ranging from about 1 ppb (pounds per barrel) to about 20 ppb.

In another aspect, embodiments disclosed here relate to methods for making a drilling fluid. The methods include mixing an aqueous base fluid with a lubricating additive where the lubricating additive is an epoxidized α-olefin. The drilling fluid may include the lubricating additive in an amount ranging from about 1 ppb to about 20 ppb.

In a further aspect, embodiments disclosed here relate to methods for using drilling fluids. The methods include introducing an aqueous-based fluid and a lubricating additive into a wellbore. The lubricating additive may be an epoxidized α-olefin and the drilling fluid may include the lubricating additive in an amount ranging from about 1 ppb (pounds per barrel) to about 20 ppb.

DETAILED DESCRIPTION

Conventional additives or coatings may be used to control the lubricity of a drilling fluid, however, most additives require an oil phase in the drilling fluid or require an emulsified drilling fluid to be effective. The oil phase in the fluid provides the proper lubrication necessary for the additives to function. Moreover, some additives may require a particular pH range and cloud point range to be compatible with the drilling fluids used. The efficacy of conventional additives and coatings is lacking, often requiring the drill to be frequently removed and cleaned before drilling can proceed further. Additionally, conventional surfactants, which are used as lubricants in drilling fluids, have a tendency to foam and are generally non-biodegradable.

Embodiments in accordance with the present disclosure generally relate to methods and compositions of an epoxidized α-olefin lubricating additive for a drilling fluid. One or more embodiments in accordance with the present disclosure relate to epoxidized α-olefin lubricating additive compositions that may be used in a water based drilling fluid to reduce torque, drag and the potential for differential sticking by reducing the coefficient of friction of the drilling fluid. Embodiments in accordance with the present disclosure generally relate to compositions of drilling fluids that do not require an oil phase or are not emulsified. The α-olefin lubricating additive may also replace conventionally used surfactants. The α-olefin lubricating additive may provide a suitable non-foaming and biodegradable substitute that is effective in reducing coefficient of friction of a drilling fluid.

As a non-limiting example, the lubricating drilling fluids of the present disclosure may be used in the oil and gas drilling industries, such as for drilling in oil and gas wells. Oil and gas wells may be formed in subterranean formations. A subterranean formation or material can be any section of a wellbore and any section of a subterranean petroleum- or water-producing formation or region in fluid contact with the wellbore. The wellbore may serve to convey natural resources, such as petrochemical products, to the surface.

To drill a subterranean well or wellbore, a drill string including a drill bit and drill collars to weight the drill bit is introduced into a predrilled hole and rotated to cause the drill bit to cut into the rock at the face of the wellbore, producing rock cuttings. The term "rock cuttings" is intended to include any fragments, pieces, or particulates separated from the formation by the drill bit or otherwise present in the wellbore.

A drilling fluid, also known as a drilling mud or simply "mud," is a specially designed fluid that is circulated through a wellbore to facilitate the drilling operation as the wellbore is being drilled. The drilling fluid can carry cuttings up from beneath and around the bit, transport them up the annulus, and allow their separation at the surface. A drilling fluid can cool and lubricate the drill head. The drilling fluid can reduce friction between the drill string and the sides of the hole. The drilling fluid may also aid in support of the drill pipe and drill head. The drilling fluid can provide a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks. The drilling fluid can be configured to form a thin, low permeability filter cake that temporarily seals pores, other openings, and formations penetrated by the bit. In water-based drilling fluids, solid particles are suspended in a water or brine solution containing other components.

Under certain extreme downhole conditions, such as excessive temperature or difficult formations, some of the properties of conventional drilling fluids may be altered. For example, the drilling fluid interacting with a formation having swelling clay, the drilling fluid having excessive solids content, or subjecting the drilling fluid to extreme downhole temperatures, may cause the conventional drilling fluid to thicken, excessively increase in viscosity, undergo gelation, or any or all of these combinations. In some drilling scenarios, conventional drilling fluids having an increased density and, therefore, increased solids content may enable drilling of a pressurized formation or may be used to control and kill a flowing downhole formation. The increased concentration of solids and increased density of the conventional drilling fluids used in these applications increase the ability of the drilling fluids to support the wellbore and provide enhanced hydrostatic pressure to prevent fluids in the formation from flowing into the wellbore. However, in these challenging scenarios, the increased density and increased solid content of the conventional drilling fluids can lead to problems, such as solids settling, stuck pipes, and excessive pump pressure.

The drilling fluid compositions described in one or more embodiments of the present disclosure may serve several functions in the drilling process. The drilling fluid compositions can provide lubrication between the drilling equipment and the wellbore during drilling operations. Additionally, the epoxidized α-olefin lubricating additive may be effective in reducing torque, drag and the potential for differential sticking by reducing the coefficient of friction (CoF) of the drilling fluid.

In one or more embodiments, the epoxidized α-olefin lubricating additive may be used in spotting fluid compositions and methods of application. As provided in this disclosure, the term "spotting fluid" refers to fluids or slurries used downhole for spotting operations. A spotting fluid can be any fluid designed for localized treatment of a downhole region. In one example, a spotting fluid can be designed to free a stuck piece of drilling or extraction equipment, can reduce torque and drag with drilling lubricants, prevent differential sticking, promote wellbore stability, and can help to control mud weight.

In one or more embodiments, the epoxidized α-olefin may be prepared by converting α-olefins into 1,2 epoxides. In such a method, the α-olefins are converted via addition of hypochlorous acid. After addition of the acid, the resultant is treated with a base to prepare the epoxidized α-olefin. Epoxidized α-olefins may also be prepared by treatment with peroxy acid (peracids). Epoxidized α-olefins may also be prepared via reaction of an α-olefin with peroxides or alkyl peroxides, such as t-butylhydroperoxide, and a molybdenum catalyst or an acid, such as acetic or formic acid. In embodiments of the method of forming the epoxidized α-olefin, the α-olefin may be selected from α-olefins having carbon atoms numbering in a range from 6 to 40 and combinations thereof, where any lower limit may be combined with any mathematically feasible upper limit. In some embodiments, the α-olefin is in a range of from 10 to 24 carbon atoms, and combinations thereof. In other embodiments, the α-olefin may range of from 12 to 18 carbon atoms, and combination thereof. The α-olefin may be linear, branched or unbranched, substituted or unsubstituted, and combinations thereof.

In one or more embodiments, the product epoxidized α-olefins of lubricating drilling fluid additive may be of the general structure shown in Formula I:

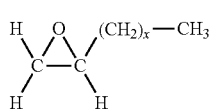

Formula (I)

where (x) may be 1 to 40. In some embodiments, x may be 1, 3, 5, 7, 9, 11, 13, 15, 17, 19, 21, 23, 25, 27, 29, 31, 33, 35, 37, and 39, and combinations thereof. In other embodiments, x may be 2, 4, 6, 8, 10, 12, 14, 16, 18, 20, 22, 24, 26, 28, 30, 32, 34, 36, 38, and 40, and combinations thereof. In one or more embodiments, x may be 5 to 17. In some embodiments, x may be from 5 to 15. Useful epoxidized α-olefins may include materials available under the product name Vikolox® Epoxidized Alpha Olefins from Arkema, Inc. (Philadelphia, Pa.). The lubricating additive may generally be used in aqueous drilling fluid compositions and methods up to temperatures of 300° F.

In embodiments of the drilling fluid composition, the composition includes an aqueous base fluid, an epoxidized α-olefin lubricating additive, and, optionally, one or more other additives.

The drilling fluid includes an aqueous-base fluid. The aqueous-based fluid includes water. The water may be distilled water, deionized water, or tap water, fresh water, production water, formation water, natural and synthetic brines, brackish water, sea water, and other waters suitable for use in a wellbore environment. In some embodiments, the water used may naturally contain contaminants, such as salts, ions, minerals, organics, and combinations thereof, as long as the contaminants do not interfere with the operation of the drilling fluid.

The aqueous-based fluid may contain from 50 wt % to 97 wt % water. In one or more embodiments, the aqueous-based fluid may comprise greater than 70 wt % water based on the total weight of the drilling fluid.

In some instances, the water used for the aqueous-based fluid will already have a certain level of salts or ions from natural sources, such as from production water, seawater, and brines. In other instances, salts and ions are added to the water used to increase the level of a salt or ion in the water to effect certain properties, such as density of the drilling fluid or to handle the swelling of clays that come into contact with the drilling fluid. Without being bound by any particular theory, increasing the saturation of water by increasing the salt concentration or the level of other organic compounds in the water may increase the density of the water, and thus, the drilling fluid. Suitable salts may include, but are not limited to, alkali metal halides, such as chlorides, hydroxides, or carboxylates. In some embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any particular theory, brines may be used to create osmotic balance between the drilling fluid and portions of the subterranean formation.

In one or more embodiments, the aqueous-based fluid may comprise one or more salts in an amount that ranges from about 1 to about 300 ppb (pounds per barrel). For example, the drilling fluid may contain the one or more salts in an amount ranging from a lower limit of any of 1, 10, 50, 80, 100, 120, 150, 180, 200, 250 and 280 ppb to an upper limit of any of 20, 30, 40, 50, 70, 100, 120, 150, 180, 200, 220, 240, 260, 280 and 300 ppb, where any lower limit can be used in combination with any mathematically-compatible upper limit.

Embodiments of the drilling fluid include an epoxidized α-olefin lubricating additive. The epoxidized α-olefin lubricating additive may be used to improve the lubricity of any aqueous-based drilling fluid, and reduce torque, drag, and the potential for differential sticking by reducing the coefficient of friction of the drilling fluid. The amount of lubricating additive included in the drilling fluid may be an amount that is sufficient to reduce metal-metal friction, metal-wellbore friction, or both, when used to reduce the coefficient of friction of a drilling fluid. Without being bound by any particular theory, the epoxidized α-olefin lubricating drilling fluid additive may form a coating around the bit, further mitigating friction and providing improved lubrication between the drilling equipment and the wellbore during drilling operations. By further reducing the frictional forces experienced during drilling operations, rotational torque and drag may also be reduced.

In one or more embodiments of the present disclosure, the epoxidized α-olefin lubricating additive may be included in the drilling fluids in an amount that ranges from 0.1, 0.5, 1.0, 2.0, 3.0, 4.0, 5.0 and 6.0 percent by weight (wt %) to 0.5, 1.0, 2.0, 3.0, 4.0, 5.0, 6.0 and 7.0 wt % by weight of the drilling fluid composition, where any lower limit may be combined with any mathematically feasible upper limit. Alternatively, the drilling fluid may contain from 0.05, 1, 1.5, 2.0, 2.5, 3.0, 3.5, 4.0, 4.5, 5.0, 6, 7, 8, 9, and 10 pounds per barrel of oil (ppb) to 1.0, 2.0, 3.0, 4.0, 5.0, 6.0, 8.0, 10, 12, 14, 16, 18, and 20 ppb of the lubricating drilling fluid additive, where any lower limit may be combined with any mathematically feasible upper limit.

In embodiments of the drilling fluid, the epoxidized α-olefin lubricating additive provides increased lubricity values. In some embodiments of the drilling fluid, the drilling fluid composition has a greater than 50% reduction in the coefficient of friction versus a similar drilling fluid composition without the epoxidized α-olefin lubricating additive. In some other embodiments of the drilling fluid, the drilling fluid composition has a greater than 75% reduction in the coefficient of friction versus a similar drilling fluid composition without the epoxidized α-olefin lubricating additive. In addition, the drilling fluid exhibits a minimal amount or tendency to foam versus when a surfactant is added to a similar drilling fluid composition. When "similar drilling fluid" is referred to in this specification, it means a comparison is being made to an equivalent composition in all other aspects but for the substitution of the specified component or omission thereof.

Optionally, in some embodiments, the drilling fluid may also contain an additive. One or more additives may be any additives known to be suitable for drilling fluids. For example, in one or more embodiments, the drilling fluid may comprise one or more additional additives such as fluid loss control agents, lost circulation control agents, antifoaming agents, viscosity adjusters, an alkali reserve, specialty additives, pH adjuster, and combinations thereof. One or more additives may be incorporated into the drilling fluid to enhance one or more characteristics of the drilling fluid.

In one or more embodiments, the drilling fluid may contain from 0.01 wt % to 20 wt % of the one or more additives, not including the weighting agent, based on the total weight of the drilling fluid. In one or more embodiments, the drilling fluid may contain from 0.1, 0.5, 1.0, 1.5, 2.0, 2.5 and 3.0 wt % to 2.0, 2.5, 3.0, 3.5, 4.0, 5 and 20 wt % of the one or more additives, not including the weighting agent, based on the total weight of the drilling fluid, where any lower limit may be combined with any mathematically feasible upper limit.

In one or more embodiments, the drilling fluid composition may include at least one pH adjuster. In embodiments, the drilling fluid composition may optionally include at least one alkali compound. Examples of alkali compounds may include, but are not limited to, lime (calcium hydroxide, calcium oxide, or a mixture of both), soda ash (sodium carbonate), sodium hydroxide, potassium hydroxide, other strong bases, or combinations of these alkali compounds. The alkali compounds may react with gases, such as $CO_2$ or $H_2S$, encountered by the drilling fluid composition during drilling operations to prevent the gases from hydrolyzing components of the drilling fluid composition. Some example drilling fluid compositions may optionally include from 0.01 wt % to 0.7 wt % soda ash. In other embodiments, the drilling fluid composition may optionally include from 0.01 wt % to 0.5 wt %, from 0.01 wt % to 0.3 wt %, from 0.01 wt % to 0.1 wt %, from 0.01 wt % to 0.05 wt %, from 0.05 wt % to 0.7 wt %, from 0.05 wt % to 0.5 wt %, from 0.05 wt % to 0.3 wt %, from 0.05 wt % to 0.1 wt %, from 0.1 wt % to 0.7 wt %, from 0.1 wt % to 0.5 wt %, from 0.1 wt % to 0.3 wt %, from 0.3 wt % to 0.7 wt %, from 0.3 wt % to 0.5 wt %, or from 0.5 wt % to 0.7 wt % pH adjuster, based on the total weight of the drilling fluid composition. Some example drilling fluid compositions may optionally include from 0.01 ppb to 10 ppb of at least one pH adjuster, based on the total volume of the drilling fluid composition.

In one or more embodiments, the drilling fluid may have a pH ranging from 5, 5.5, 6, 6.5, 7, 7.5, 8, 8.5, 9, 9.5, and 10 to 6, 6.5, 7, 7.5, 8, 8.5, 9, 9.5, 10, 10.5 and 11, where any lower limit may be combined with any mathematically feasible upper limit.

Optionally, in one or more embodiments of the present disclosure, the drilling fluid may include weighting agents, which may be dispersed in the drilling fluid. The solids may be finely divided solids having a high specific gravity (SG) that may be added to the drilling fluid to increase the density of the drilling fluid. Examples of weighting materials suitable for use as the solid include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), or any combination of these weighting materials. In some embodiments, the drilling fluid may include barite as the solid.

The drilling fluid composition may include a weight percent of weighting material sufficient to increase the density of the drilling fluid composition to allow the drilling fluid composition to support the wellbore and prevent fluids in downhole formations from flowing into the wellbore. In embodiments, the drilling fluid composition may include from 1 wt % to 30 wt % weighting material based on the total weight of the drilling fluid composition. For example, the drilling fluid may contain weighting agents in an amount ranging from about 1 ppb to about 700 ppb, such as from 1 ppb to 700 ppb, or 10 to 650 ppb. In some embodiments, the drilling fluid may contain weighting agents in an amount ranging from 50 ppb to 700 ppb, from 100 ppb to 600 ppb, or from 200 ppb to 500 ppb.

In some embodiments, the drilling fluid may have a density of from 62 pounds of mass per cubic foot (pcf) to 170 pcf, as measured using Fann Model 140 Mud Balance according to ASTM Standard D4380. For instance, the drilling fluid may have a density of from 63 pcf to 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, or from 70 pcf to 100 pcf. The drilling fluid may have a density that is greater than or equal to 62 pcf, greater than or equal to 70 pcf, or greater than or equal to 100 pcf. In some embodiments, the drilling fluid may have a density of from 120 pcf to 160 pcf.

One or more embodiments of the present disclosure additionally relate to methods of producing a lubricating drilling fluid additive for a drilling fluid. The produced drilling fluids may be in accordance with any of the embodiments previously described. The method of preparing the drilling fluid composition may include mixing water, and an epoxidized α-olefin lubricating additive, optionally, one or more drilling fluid additives in accordance with any of the embodiments previously described so as to form the drilling fluid.

One or more embodiments of the present disclosure may also relate to method for using the drilling fluid in drilling operations. The drilling fluid may be in accordance with any of the embodiments previously described. In some embodiments, the drilling fluid may be introduced into wellbore, the drilling fluid composition comparing the components as previously described.

One or more embodiments of the present disclosure may also relate to method for using the epoxidized α-olefin lubricating additive in a spotting fluid composition. One or more embodiments of the present disclosure may also relate to method for using the epoxidized α-olefin lubricating additive in a completion fluid composition.

Recirculating the fluid may allow the drilling fluid to cool and lubricate the drill bit. As well, the drilling fluid lifts rock cuttings and other downhole debris away from the drill bit to clear the hole. The drilling fluid also provides for greater lubrication of the drilling equipment and provides a reduction in the coefficient of friction between the drilling equipment and the wellbore, resulting in a reduction in torque and drag during drilling operations.

EXAMPLES

The following examples are illustrative and should not be interpreted as limiting the scope of the present disclosure.

The effectiveness of epoxidized α-olefin as a lubricating additive was examined by performing lubricity tests on several water-based drilling fluids. Experimental test were designed and executed to determine and demonstrate the respective coefficient of friction properties of drilling fluids where the fluid is a water-based mud. The epoxidized α-olefin additive may serve as a biodegradable, non-foaming additive to reduce the coefficient of friction of the drill fluid without requiring the use of an oil phase in the drilling fluid or use of an emulsified drilling fluid with a conventional surfactant.

Three different KCl based drilling fluids were formulated to comparatively demonstrate the effectiveness of the epoxidized α-olefin lubricating additive in comparison with conventional drilling fluid additives. The three formulations are provided in Table 1, which include two comparative compositions and Example 2, a drilling fluid composition prepared in accordance with one or more embodiments of the present disclosure. A water based drilling fluid comprising KCl was formulated to test the effectiveness of the epoxidized alpha olefin in reducing the coefficient of friction. A standard OFITE lubricity meter (OFI Testing Equipment) was used to determine the change in coefficient of friction for the drilling fluids.

Comparative Example 1 was formulated in the absence of any lubricant and is the "base" drilling fluid, where the water, potassium chloride, and potassium hydroxide are mixed for 2 minutes. Example 2, an embodiment of the drilling fluid, was formulated with about 1% by volume (vol %) of the epoxidized α-olefin lubricating additive, specifically 1,2-epoxydecane (Vikolox® 14), 35 ppb potassium chloride, and 0.15 ppb potassium hydroxide. The performance of Vikolox® 14 was compared with a widely used commercial lubricant. The conventional commercial lubricant is an epoxidized methyl ester of vegetable oil based lubricant supplied by Oleon. Comparative Example 3 was formulated in the same manner as Comparative Example 1, and Example 2, with about 1 vol % of the conventional lubricant substituted for Vikolox® 14. In both Examples 2 and 3, potassium chloride and potassium hydroxide were first added to the base water and mixed for two minutes. After mixing the respective lubricant, 1,2-epoxydecane or commercial lubricant were added to the mixture of potassium chloride and potassium hydroxide and mixed for an additional two minutes.

TABLE 1

Drilling fluid formulations

| Additive | Comparative Example 1 | Example 2 | Comparative Example 3 |
|---|---|---|---|
| Fresh Water | 0.922 Barrel (bbl) | 0.922 bbl | 0.922 bbl |
| KCl | 35 ppb | 35 ppb | 35 ppb |
| KOH | 0.15 ppb | 0.15 ppb | 0.15 ppb |
| Vikolox ® 14 ™ | — | 3.5 milliliter (ml) (2.96 ppb) | — |
| Commerical lubricant | — | — | 3.5 ml (3.5 ppb) |

The three formulations were prepared as described in Table 1. The prepared solutions were then tested with the OFITE lubricity tester. The coefficient of friction for each solution was recorded. The resulting data is provided in Table 2.

Table 2 shows that the coefficients of friction in the tested brines were significantly reduced when the lubricating additive comprising epoxidized α-olefin was present. This is indicative of the effectiveness of the lubricating additives in lowering torque and drag by reducing friction between metal components and the wellbore, or metal components and other metal components. In addition, such data is illustrative of the ability of the lubricating additives to prevent differential sticking of downhole tubulars.

Comparative Example 1 provided a coefficient of friction (CoF) of 0.30 while Example 2 and Comparative Example 3 gave CoF of 0.06 and 0.16 respectively. Thus, the lubricating epoxidized α-olefin additive, was able to reduce the CoF by 80% as compared with the "base" fluid. The commercial lubricating additive was able to reduce the coefficient of friction by only 46.6% versus Comparative Example 1. The results show that the epoxidized α-olefin lubricating additive was more effective than the commercially available lubricating additive in reducing the coefficient of friction. Additionally, foaming was not observed in the formulation comprising epoxidized α-olefin lubricating additive in Example 2.

TABLE 2

Coefficient of friction values (CoF) for the three drilling fluids

| Additive | Comparative Example 1 | Example 2 | Comparative Example 3 |
|---|---|---|---|
| Coefficient of Friction | 0.30 | 0.06 | 0.16 |

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A drilling fluid comprising:
    an aqueous-based fluid; and
    a lubricating additive, wherein the lubricating additive is an epoxidized α-olefin that has the general structure of Formula (I):

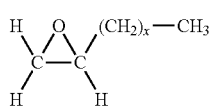

Formula (I)

where x is in a range of from 1 to 40, and
wherein drilling fluid comprises the lubricating additive in an amount ranging from about 1 ppb (pounds per barrel) to about 20 ppb.

2. The drilling fluid composition of claim 1, wherein the aqueous-based fluid of the drilling fluid comprises greater than 70 wt % (weight percent) of the drilling fluid.

3. The drilling fluid composition of claim 2 where the aqueous-based fluid is a brine.

4. The drilling fluid composition of claim 1 further comprising an additive selected from the group consisting of fluid loss control agents, lost circulation control agents, supplemental weighting agents, fluid loss additives, viscosity adjusters, an alkali reserve, pH adjuster, and a combination thereof.

5. The drilling fluid composition of claim 4, wherein drilling fluid composition comprises the additive in an amount ranging from 1 to 30 wt %.

6. The drilling fluid composition of claim 1 further comprising a weighting agent.

7. The drilling fluid of claim 1 where a coefficient of friction of the drilling fluid is less than 50% of the coefficient of friction of a similar drilling fluid without the lubricating additive.

8. A method for making a drilling fluid comprising:
    mixing an aqueous base fluid with a lubricating additive, wherein the lubricating additive is an epoxidized α-olefin that has the general structure of Formula (I):

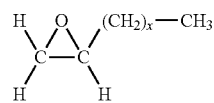

Formula (I)

where x is in a range of from 1 to 40, and
where the drilling fluid comprises the lubricating additive in an amount ranging from about 1 ppb (pounds per barrel) to about 20 ppb.

9. The method of claim 8, wherein the aqueous-based fluid of the drilling fluid comprises greater than 70 wt % (weight percent) of the drilling fluid.

10. The method of claim 8, wherein the aqueous-based fluid is a brine.

11. A method for using a drilling fluid comprising:
    introducing a drilling fluid into a wellbore, the drilling fluid comprising:
        an aqueous base fluid with a lubricating additive, wherein the lubricating additive is an epoxidized α-olefin that has the general structure of Formula (I):

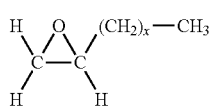

Formula (I)

where x is in a range of from 1 to 40, and
where the drilling fluid comprises the lubricating additive in an amount ranging from about 1 ppb (pounds per barrel) to about 20 ppb.

12. The method of claim 11 where the drilling fluid is introduced into the wellbore through a drill string.

13. The method of claim 11, where a coefficient of friction of the drilling fluid is less than 50% of the coefficient of friction of a similar drilling fluid without the lubricating additive.

14. The method of claim 11, where the aqueous-based fluid is a brine.

15. The method of claim 11 further comprising an additive selected from the group consisting of fluid loss control agents, lost circulation control agents, supplemental weighting agents, fluid loss additives, viscosity adjusters, an alkali reserve, pH adjuster, and a combination thereof.

16. The method of claim 15, wherein drilling fluid comprises the additive in an amount ranging from 1 to 30 wt %.

17. The method of claim 15, wherein the drilling fluid comprises one or more salts in an amount that ranges from 1 to 300 ppb.

* * * * *